Sept. 16, 1952   F. W. KRIEWALL   2,610,528
HYDRAULIC DRILL FEED AND STROKE TIMING MECHANISM
Original Filed Nov. 6, 1944   5 Sheets-Sheet 4

Sept. 16, 1952      F. W. KRIEWALL      2,610,528

HYDRAULIC DRILL FEED AND STROKE TIMING MECHANISM

Original Filed Nov. 6, 1944      5 Sheets-Sheet 5

Inventor
Fred W. Kriewall
By Charles R. Fay,
Attorney

Patented Sept. 16, 1952

2,610,528

UNITED STATES PATENT OFFICE 2,610,528

HYDRAULIC DRILL FEED AND STROKE TIMING MECHANISM

Fred W. Kriewall, Van Dyke, Mich., assignor to Leland-Gifford Company, Worcester, Mass., a corporation of Massachusetts Continuation of application Serial No. 562,212, November 6, 1944. This application November 22, 1948, Serial No. 61,425

8 Claims. (Cl. 77—32.4)

1

This invention relates to new and useful improvements in tool feeding and tool stroke timing mechanisms in machine tools. The invention is particularly adapted to use on machines in the nature of drilling machines where it is desired to drill in short quick steps, as in deep hole and small hole drilling and in particularly hard materials. Until the present invention, holes were drilled either in uniform steps or in steps dependent on the torque applied to the drill, but this invention provides for adjustable steps of almost any length, or in effect, shortness desired, by completely hydraulic means.

It is another object of the invention to provide a mechanism of this type in which the feeding and withdrawal is all hydraulically operated and easily adjusted so that a positive feed of the most flexible type is provided.

It is another object of the invention to provide a mechanism of this class which will be simple in structure, economical to manufacture, durable, compact, possessed of a minimum number of parts and highly efficient in use.

Another object of the invention resides in the provision of a hydraulic device for controlling the stroke of a tool such as a drill, to effect extremely short drill feed steps, as for instance, in small and deep hole drilling, and resulting in control of the timing of the cycle of feed, so that this invention in reality relates to timing control of a nature to provide for shorter steps than have been heretofore possible, and consequent prolongation of drill life and higher efficiency in general of the machine; and the provision of a device as above stated which acts automatically depending on a predetermined volume of fluid received from the main drill feed cylinder.

It is another object of the invention to control automatically the timing of the tool cycle easily and quickly by hydraulic means to provide for rapid very small or short drilling steps, and to provide means varying the steps according to variations in resistances met by the tool, particularly in ordinary variations in like work pieces of varying hardness due to unevenness in heat treatment, for example; so that harder pieces will occasion shorter steps, whereby the machine will always operate at maximum efficiency and at best cycling for prolonging the life of the drills.

A further object of the invention resides in the

2 construction and operation of the device for accomplishing the tool stroke control above referred to, by predetermined but adjustable volumes of hydraulic fluid received thereby from the main tool feed cylinder, and in combination therewith a tool overload reversing device for undue resistances sometimes met by the tool.

Other objects will appear hereinafter.

It is recognized that various changes and modifications may be made in the detail of structure illustrated without departing from the invention itself and it is intended that such changes and variations shall be encompassed within the scope of the claims which form a part of this specification.

Forming a part of this specification are drawings in which:

Fig. 13 is a bottom plan view looking in the direction of arrow 13 in Fig. 11.

Figure 1:
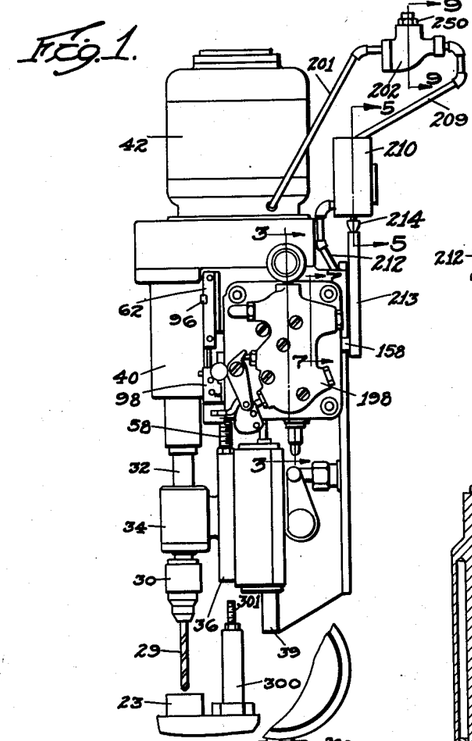
Fig. 1 is a side elevational view of a drill press showing the invention applied.
Figures 2, 6, 7, 8, 29:
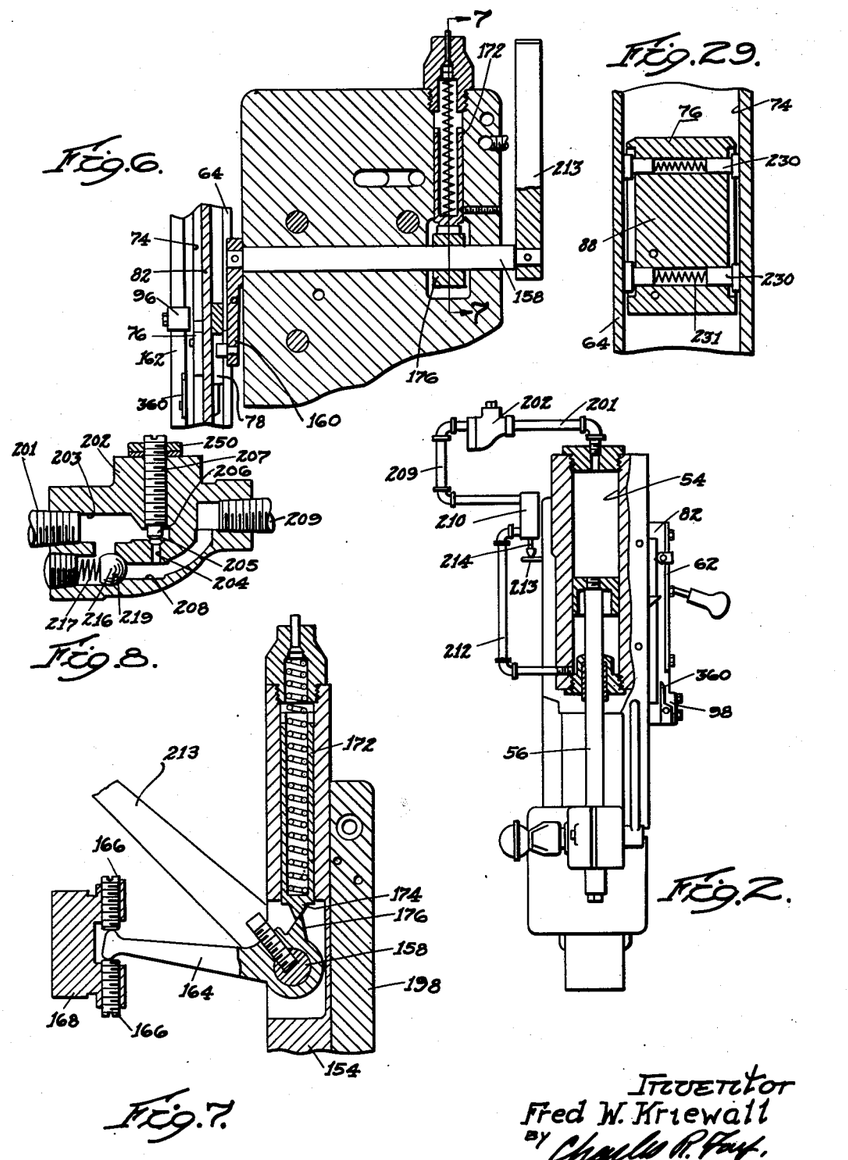
Fig. 2 is a fragmentary view of the power cylinder showing parts in section and showing other parts in elevation attached thereto.
Fig. 6 is a sectional view, taken on substantially line 6—6 of Fig. 3.
Fig. 7 is a sectional view, taken on line 7—7 of Fig. 1.
Fig. 8 is a vertical sectional view through the timing valve.
Fig. 29 is a cross-sectional view, taken on line 29—29 of Fig. 12.
Figures 11, 12, 15, 19, 22:
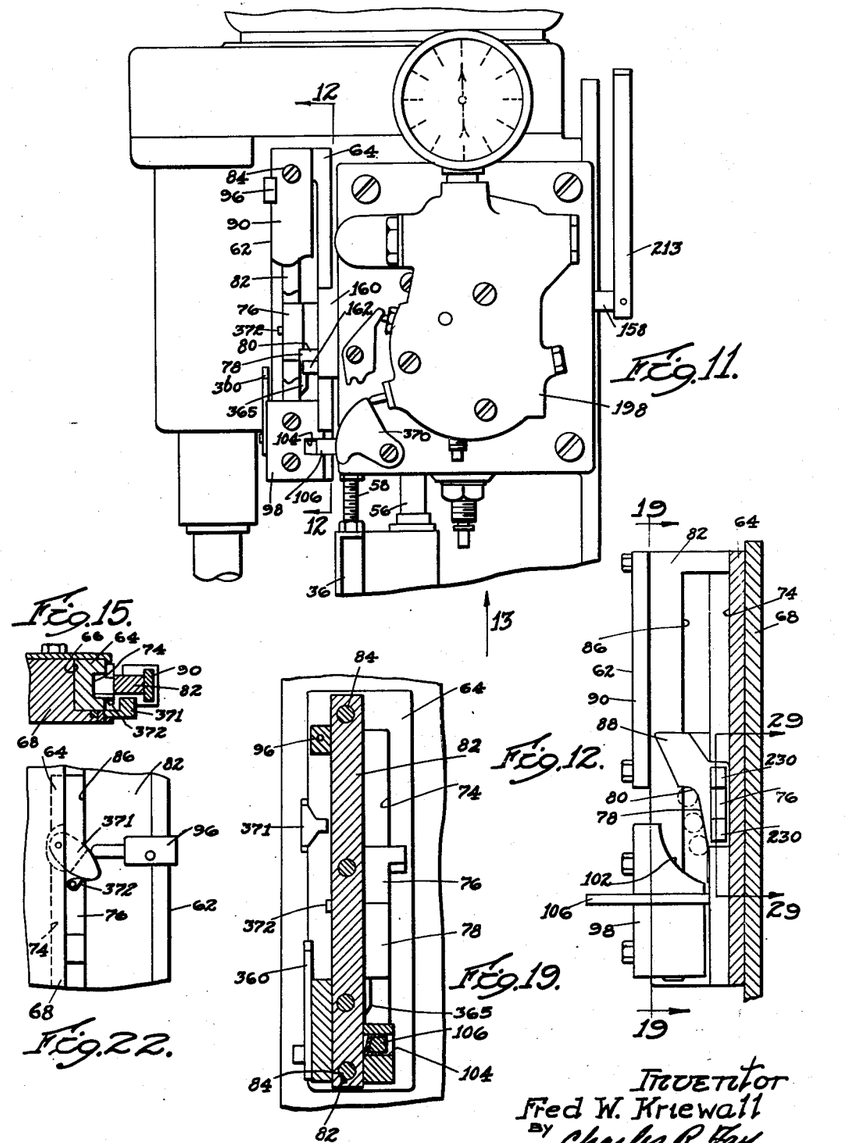
Fig. 11 is a fragmentary enlarged plan view of the tripping mechanism used in the invention with parts broken away and parts shown in section.
Fig. 12 is a sectional view, taken on line 12—12 of Fig. 11.
Fig. 15 is a sectional view, taken on line 15—15 of Fig. 14.
Fig. 19 is a sectional view, taken on line 19—19 of Fig. 12.
Fig. 22 is a fragmentary detailed view of a cam shown in tripped position for resetting the machine into original starting position.
Figures 14, 23:
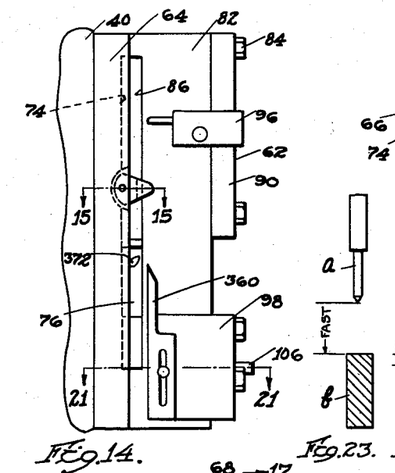
Fig. 14 is a side elevational view of slide 64 and associated parts.
Figs. 23 through 28 illustrate diagrammatically the speed of advancement and retraction of the tool in relation to the work, in accordance with the present invention.
Figures 16, 18:
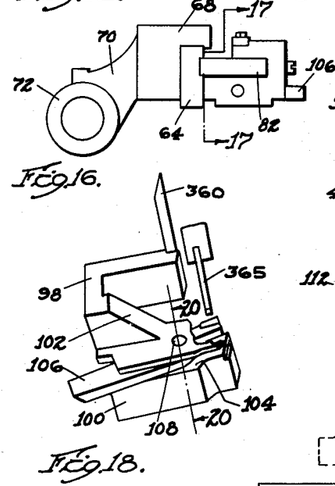
Fig. 16 is a bottom view of the parts of Fig. 14.
Fig. 18 is a perspective view of a tripping mechanism used in the invention.
Figure 17:
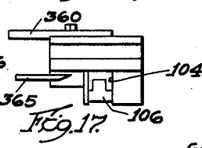
Fig. 17 is a sectional view, taken on line 17—17 of Fig. 16.
Figure 20:
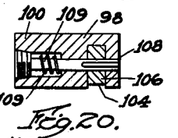
Fig. 20 is a sectional view, taken on line 20—20 of Fig. 18.
Figure 21:
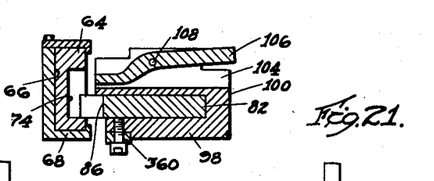
Fig. 21 is a sectional view, taken on line 21—21 of Fig. 14.
Figure 24:
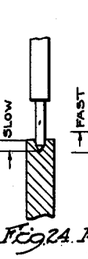

The hydraulic tool involving the present invention comprises a drilling machine having a drill 29, Fig. 1, which is adapted to drill a hole in the work 23. The drill is carried by a chuck 30 fixed to a shaft 32 journalled in a bearing block 34 carried by a slide 36 that is slidable axially of the drill shaft 32 on a guideway 39 that is a part of the general frame 40 of the unit, the unit being adapted for support on some convenient base. A motor 42 is carried by the frame 40 and serves to drive, through suitable gearing, the drill shaft 32, the drive connection between the motor and the drill shaft 32 being such that the drill shaft 32 may be moved axially of the motor 42 while rotated thereby, this form of drive connection forming no part of the present invention and being well known. The slide 36 is reciprocated hydraulically by a piston 52 disposed in a cylinder 54 formed integrally with the general frame 40 at one side of the spindle and its driving shaft. The piston 52 has a piston rod 56 which has internally screw-threaded engagement with a coaxially disposed screw-threaded rod 58 connected with the slide 36 so that the piston and slide are caused to reciprocate as a unit. The piston rod 56 and screw-threaded rod 58 are held locked in any adjusted position by a lock nut 60. The piston is reciprocated by the admission of pressure liquid alternately on opposite sides thereof, and the movements of the piston are controlled by a cam slide 62, see Figs. 1, 2, 11, 12, 13, 14, 15 and 21. Said slide includes a generally flat longitudinally extended slide bar 64 that is slidable in a horizontal groove 66 of the frame 40 behind a plate 68 which is secured to the frame 40 and overlies the upper portion of the front face of the bar and retains the bar in the groove. A bracket 70, see especially Fig. 16, is secured to the forward edge of said bar 64 and has a boss 72 which encircles the piston rod 56 behind the lock nut 60 so that the slide bar 64 and the piston reciprocate together. Said bar 64 has a longitudinal groove 74 in its outer face in which plate 88 of a cam block or control member 76, see especially Figs. 6, 12, 13 and 19, is slidably retained. The control member or cam block 76 is frictionally held by shoes 230 floating in the grooves or slide 74. The shoes 230 are disposed in opposite side walls of the portion 88 of the cam block 76 and are moved against and held to the sides of the slide by springs 231, see Fig. 29. This arrangement permits the cam to be floatingly held relative to the slide bar 64, that is, the cam block is held stationary as the bar 64 moves. Said cam block has an inclined cam face 78 which leads to a flat or dwell face 80 for giving a slow speed advance of the piston and connected tool. The cam block 76 is movable downwardly along the slide bar 64 a predetermined distance or, more accurately, the slide bar 64 moves, while the cam block 76 is held stationary, during each successive advance of the slide bar and the tool in a manner hereinafter to be explained for the purpose of effecting a following further advance of the tool each time it is reciprocated, until a predetermined advanced position of the tool has been reached. The slide bar 64 has a forwardly extended bar 82 secured to it at its ends by screws 84 and having a groove 86 which confronts the groove 74 in said slide bar and in which groove 86 the vertical plate 88 of said cam block 76 is movable. The outer face of said block 82 is provided with a longitudinally extending bar 90 upon which a stop 96, see especially Figs. 11 and 14, is secured in any suitable longitudinally disposed location on said bar. Said stop cooperates with said cam block 76 in a manner presently to be described. A cam block 98, see Figs. 11, 14, 12, 18, 15 and 16, is secured adjustably on said bar 82 at or near the end thereof and has means adapted to effect the advancing movement of the piston and tool after it has been retracted from some intermediately advanced position and also to hold the piston and tool in a completely retracted position after it has been retracted from a fully advanced position or has been retracted by manual or other external control during an intermediate part of the cycle. Said cam block 98 is provided with a plate 100 which underlies the bar 82, and said plate has a rearwardly directed inclined cam face 102, see especially Fig. 18, that is adapted to assist in returning an arm 160 into a neutral position when the tool is in fully retracted position. The plate 100 has a transverse vertical slot 104 therein, see especially Figs. 15 and 18, in which a valve controlling latch lever 106 is vertically movable on a pivot 108, the lever being normally biased for movement in a counterclockwise or downward direction when viewed as shown in Fig. 18 in a depressed position by a spring 109, see Fig. 20. Said lever 106 serves to effect the advance of the piston after it has been retracted from some intermediately advanced position.

Figures 9, 10:
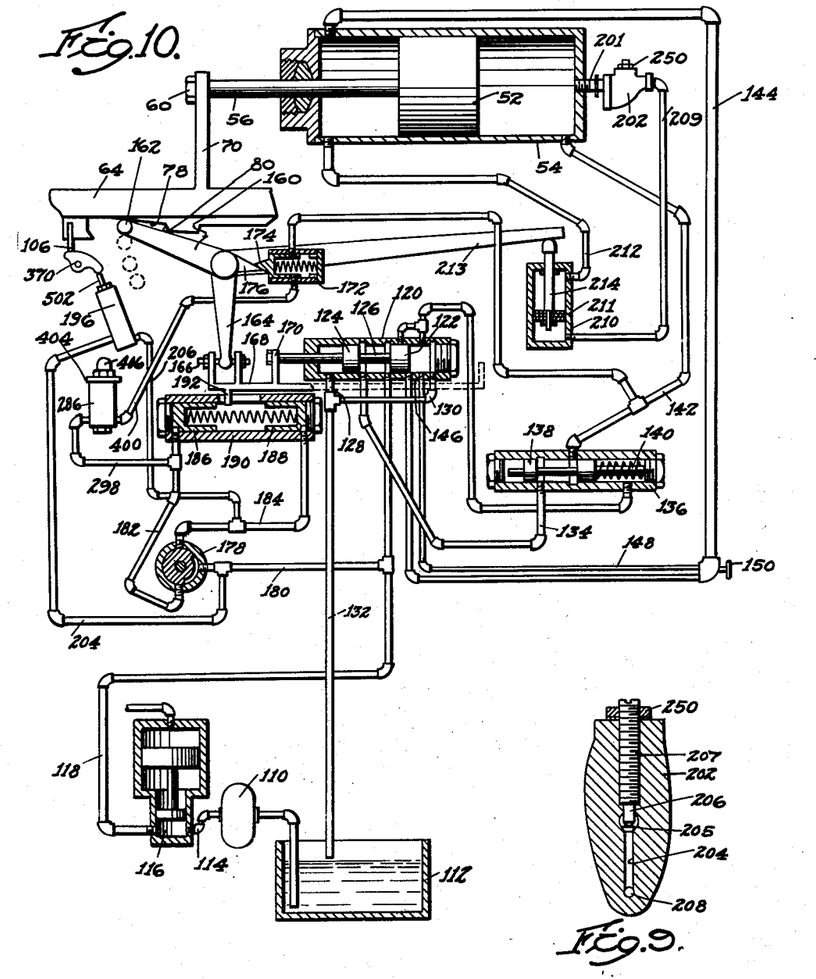
Fig. 9 is a sectional view, taken on line 9—9 of Fig. 1.
Fig. 10 is a schematic view of piping used in the mechanism.

The movements of the piston are controlled by hydraulic valves which, in addition to manual operation by which the advance of the piston can be started and the piston can be returned to fully retracted position at any time under control of an operative, are operated automatically by the aforesaid cams 78, 102, and the lever 106 to effect the desired control of the mechanism. The valves and the hydraulic system associated with the present apparatus are diagrammatically illustrated in Fig. 10 and will now be described. The hydraulic system includes a continuously operating oil pump 110 preferably, although not necessarily, of the gear type which receives oil flow from a reservoir 112 and forces it through a pipe 114 into the cylinder of a compressed air accumulator 116 from which the oil flows through a pipe 118 into a valve housing 120 having the piston valves 122 and 124 therein connected together by a valve stem 126. The opposite ends of the valve cylinder are connected by pipes 128 and 130 to a pipe 132 which conducts exhaust oil back into the reservoir 112. A pipe 134 is in communication with an intermediate part of the valve cylinder and also with a piston-speed controlling valve cylinder 136 that has the piston valve 138 therein which is acted upon by a spring 140 to urge the valve constantly toward the left. A pipe 142 communicates with an intermediate part of the valve cylinder 136 and also with the rear or right-hand end of the piston cylinder 54. A pipe 144 communicates with the forward or left-hand end of the cylinder 54 and with a port 146 in the valve cylinder 120. In Fig. 10 the parts are set for a fast forward feed of the piston and tool, the valves 122, 124, and also the piston-speed control valve, being at the extreme left. The high pressure oil from the pipe 118 passes unthrottled through the valve cylinder 120 and 136 into the rear end of the cylinder 54 behind the piston 52 and thereby advances the piston at maximum speed, the oil in front of the piston escaping through the pipe 144 into the right-hand end of the valve cylinder 120 and through the pipe 130 back into the reservoir 112. The piston 52 is also adapted to have a slower rate of advance in which case the piston valves 122 and 124 are moved sufficiently to the right to close the exhaust port 146 and also partially to close the outlet port communicating with the pipe 134. The oil escaping from the forward end of the piston is now constrained to pass into the exhaust end of the valve cylinder 120 through a pipe 148 which communicates with the pipe 144 through a throttle valve 150, which throttle valve retards the flow of oil and thereby sets up a back pressure oil on the piston 52 and holds the piston against jumping due to variable resistance between the work and the tool operated by the piston.

Figure 3:
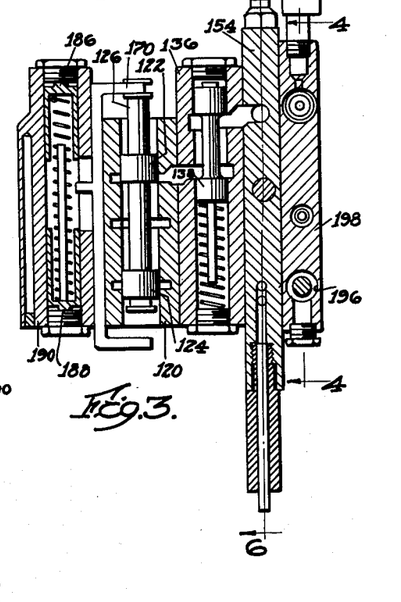
Fig. 3 is a fragmentary, sectional view, taken on line 3—3 of Fig. 1.

The valves 122 and 124 can be advanced toward the right to completely close the outlet connected with the pipe 134 and also the exhaust port 146 and the outlet of the pipe 148, thereby preventing flow of oil into and out of both sides of the piston and holding the piston 52 immovably in any position in which it may have been moved. A movement of the valves 122 and 124 further toward the right places the pipe 134 in communication with the exhaust pipe 128 and the pressure pipe 118 in communication with the pipe 144, thereby supplying high pressure oil to the forward end of the piston cylinder 54 and establishing an unrestricted exhaust passage for the rear end of the cylinder so that the piston 52 is retracted at a rapid rate. The valve cylinders 120 and 136 are secured one against the other to the inner face of a valve supporting plate 154, which is bolted over a recess 112 in the frame 40 of the mechanism, see Figs. 3 and 21, which recess comprises the oil reservoir of the system. The valves 122 and 124 are operated by a valve operating member comprising a shaft 158 which has an arm 160 fixed to its upper end, the arm having an upstanding cam pin 162 that is disposed in position to be engaged by the cam blocks 76 and 98, said arm overlying the top of the valve supporting plate 154 and being disposed in front of the slide 64. A rearwardly extended arm 164 is fixed to the lower end of the said shaft 158 and has its end terminated between longitudinally adjustable screws 166 carried by a slide 168 located in a groove in the valve cylinder 120 and having an arm 170 that is connected to the stem 126 of said valve so that said slide and valve stem are caused to move together. The position of said arm 160 thus determines the operative condition of the piston 52. When the arm 160 is in the position illustrated in Fig. 10 with its pin 162 disposed in front of but out of engagement with the cam block 76, the valves are in condition for a rapid advance of the piston 52. When the pin 162 is on the dwell portion 80 of the cam block 76, the setting of the valves is such as to give a slow or working advance of the piston. This is indicated by the first dotted line positioned in Fig. 10. When the pin 162 is in the next advanced position, away from the dwell portion 80 and engaged by the cam face 102 of the block 98, the valves are in neutral position and the piston 52 is stationary. This is indicated by the second dotted line position in Fig. 10. When the pin 162 is in the fourth position illustrated by the third dotted line position in Fig. 10, the mechanism is set for a fast return of the piston 52. The arm 160 is held either in high or slow speed advance positions or in reverse position by means including a spring-pressed plunger 172 that has a triangular cam projection 174 that abuts against a similar cam projection 176 fixed to the shaft 158, see Fig. 7. The arrangement of said cam projections is such that their apexes coincide somewhere between neutral and slow speed positions of the arm 160 so that when the cam projections are in the position illustrated in Fig. 10, the arm 160 is biased toward a high speed position and when the cam projection 176 is on the other side of the cam projection 174, the arm 160 is biased toward reverse. The arm 160 must be held in neutral position against the action of the plunger 172 and this is done by engagement of the pin 162 with the cam 102 at the time the piston 52 is in fully retracted position.

Figure 4:
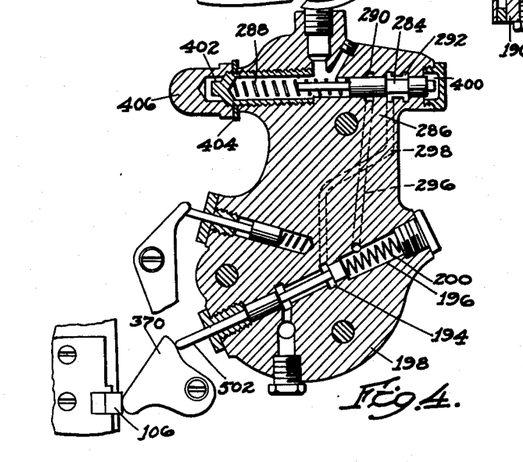
Fig. 4 is a sectional view, taken on line 4—4 of Fig. 3.
Figure 5:
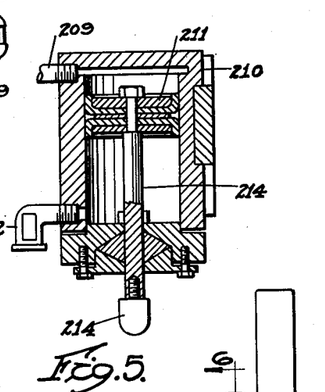
Fig. 5 is a sectional view, taken on line 5—5 of Fig. 1.

When the piston 52 is in fully retracted position, it can be started in a forward direction under manual control and also can be returned to fully retracted position in any part of its working cycle also under manual or other control. This is accomplished by a manually or otherwise operated three-way valve 178, diagrammatically shown in Fig. 10, which admits pressure fluid from a pipe 180 communicating with the pressure pipe 118 alternately into the pipes 182 and 184 which admit pressure oil behind the spring-pressed pistons 186 and 188 operating in the cylinder 190. Said pistons are movable into engagement with a pin 192 carried by the valve slide 168 and are arranged to move said valve slide and the arm 160 in opposite directions. When the piston 52 is in a retracted position, less than its fully retracted position but sufficiently to clear the drill from the work, in an intermediate part of its cycle of operations, the piston is adapted to be reversed and advanced by the operation of a piston valve 194 operating in a cylinder 196, see Figs. 4 and 10, carried by a valve block 198 secured to the outer face of the valve carrying plate 154. Said valve 194 is normally biased by a spring 200 into a closed position but, when the valve stem 502 is depressed, the valve is adapted to admit pressure fluid to flow from the pipe 204 through the pipe 206 and into the pipe 184, thereby to move the piston 188 and cause the reversal of the valves 122, 124, the arm 160 and the piston 52. Many of the actual piping connections of the parts illustrated in Fig. 10 have been omitted or modified to aid in a clearer understanding of the invention. For instance, fluid passages here shown as pipes, such for instance, as exhaust pipes 128, 130 are not actually as shown, the exhaust ports of the valves merely discharging into a space which is above the oil reservoir 112 that is located in the bottom of the frame 40 of the mechanism.

Figure 25:
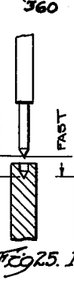
Figures 26, 27:
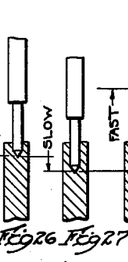
Figure 28:
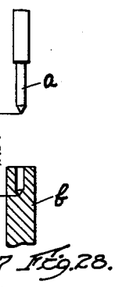

It will now be understood that the piston 52 can advance at a rapid rate until the pin 162 rides upon the dwell portion 80 of the cam block 76, whereupon the piston advances at a slower speed until the arm 160 is moved into a reversed position, whereupon the piston retracts rapidly. In accordance with this invention, the piston 52 and the tool associated therewith, are required automatically to make a plurality of high speed and low speed advancing movements into successively advanced positions and alternated with retracting movements to the same position and terminated with a retracting movement to a further and fully retracted position. The nature of this work requiring these operations is best illustrated in Figs. 23 through 28. Fig. 23 represents the initial position of the work b and the drill a at the beginning of a cycle. The drill a is required to advance at a fast rate up to the surface of the work b and then to advance at a slow rate into the work to some position shown in Fig. 24 from which position the drill is retracted rapidly into the position as illustrated in Fig. 25, where the drill is sufficiently clear of the work so that the chips can fall away from the drill and permit the drill point to be bathed in the coolant that is customarily flowed upon the surface of the work at the mouth of the hole whereby to cool the drill point and prevent it from overheating and losing its cutting edge. The drill is then desired to be advanced rapidly to the bottom of the hole into the position illustrated in Fig. 26 and then further into the work at slow speed into some position as illustrated in Fig. 27. The drill is then required to be retracted into the position illustrated in Fig. 26, if the hole is not yet deep enough, and then advanced again in the manner illustrated in Figs. 26 and 27, or if the hole is deep enough, to be retracted into the final position illustrated in Fig. 28. These results are accomplished by holding the cam block 76 stationary when it is in slow speed engagement with the pin 162 of the arm 160 so that the slide 64, which moves with the drill, can move the required distance without carrying the cam block with it. When this distance is reached, the cam block is caused to move with the slide while a hydraulic control means is provided for moving the controlling arm 160 into reverse position so that the tool and the slide and the cam block are retracted as a unit and then advanced with the cam block in a different position on the slide. To accomplish this, there is leading from the top of cylinder 54 a pipe 201 which communicates with an inlet passage 203 in a valve body 202. The passage 203 communicates with the passage 204 which, in turn, communicates with an outlet passage 208. Between the passages 203 and 204, a valve seat 205 is provided in the valve body 202 upon which is adapted to seat a valve or metering pin 206. The metering pin 206 is provided with a threaded shank 207 which extends exteriorly of the valve body 202. The head of the valve or metering pin 206 is provided with a screw-driver slot for adjusting the valve on the seat 205 and is held in fixed position by a lock nut 250. Leading from the passage 208 is a conduit 209 which communicates at the top of a cylinder 210 in which is disposed the piston 211. Leading from the cylinder 210 from the opposite side of the piston 211 is a conduit 212 which communicates with the bottom of the cylinder 54. The piston 211 is provided with a piston rod 214 which protrudes through the closed end of the cylinder 210 and engages one end of an arm 213 whose opposite end is fixedly secured to the shaft 158, see Fig. 6.

As previously described, the tool or drill 29 enters the work piece upon the downward movement of the piston 52 in the normal manner of a rapid approach to the work and slow advancement in the work. As the fluid or oil under pressure enters the top of the cylinder 54 to advance the piston 52 and the tool downwardly, a portion will pass from the cylinder through conduit 210, passages 204, 208, and conduit 209 into the top of cylinder 210 moving the piston 211 towards the opposite end in its cylinder. The passage of oil to the cylinder 210 will be throttled by the setting of the metering pin 206 which determines the time of travel for the piston 211 to complete its stroke. The stroke will determine the depth desired that the tool should enter the work piece before its withdrawal. On the downward travel of the piston 211, it will rock the arm 213 which, through shaft 158, will rock arm 164 carrying the pin 162 out of engagement with the cam body 76 and simultaneously through the rocking of arm 164 engage valve 120 for reversing the flow of fluid to the cylinder 54. A reverse flow of fluid to the cylinder 54 will move the piston 52 and also the piston 211 to the top of their respective cylinders. The lower ends of the cylinders are joined in communication by pipe 212. The fluid or oil above the piston 211 will flow outwardly through pipe 209, passages 208 and 203, conduit 201, into the cylinder above the piston 52, thence out through conduit 142 through already described circuit of valves and passageways to the reservoir 112. A check valve is provided at the junction of passageway 208 and passageway 203 which comprises a ball 216 held by spring 217 upon seat 219 which is formed at the exit of passageway 208.

As the tool is retracted, the slide bar 64 together with the cam block 76, which has been partially moved by pin 162 towards the right on bar 64, is carried to the right, see Fig. 10, until the piston 52 reaches the top of its cylinder. As the bar 64 reaches the end of its travel, latch lever 106 engages cam 370 sufficiently rocking the cam to press the plunger 502 and through the operation of valve 196 hydraulically reset the machine for advancing the tool towards and into the work piece, as previously described. On each cycle of operation, the cam block 76 is carried further along the bar 64 until it has reached its maximum point of travel which is determined by the depth that the tool is to enter the work piece. At this point, which is the last or final down stroke of the drill 29, arm 371 will strike the stop 98 rocking arm 371 until it strikes abutment 372 projecting from cam block 76, see Fig. 22. As the arm 371 is mounted to the frame 40 of the machine, the cam block 76 will be held stationary as the bar 64 travels to the right which is a retraction of the tool from the work piece, thereby placing the cam block 76 over to the left end of the slide, see Fig. 10. As the cam block reaches the extreme left position of the slide, an extended finger 360 will engage arm 371 rocking it into neutral position, see Fig. 14. The arm is grooved on its under face to permit the abutment 372 to pass underneath when the arm is in neutral position during the intermediate cycling operation. Simultaneously as the cam block 76 is moved to its extreme left position in the slide, the finger 365 carried by block 76 engages and rocks latch lever 106 to prevent its engagement with cam 370 and thereby preventing the tripping of the valve 196 for resetting the hydraulic feed for the down stroke and the machine is thus automatically stopped. A manual resetting of the valve 196 or by manually resetting the reversing valve 178, as previously described, will start the machine upon the same cycling operation upon the next or new work piece.

As the engagement of the stop with the latch lever 106 does not provide for a uniform stopping of the machine, thereby making it difficult for close precision work, a final stop is provided which comprises a block 300 having an adjustable pin 301. The block 300 is set upon the table of the machine or in alignment with the work piece in a manner whereby the slide 36 may abut and come to rest against the pin 301. The height of the block 300 with the adjustment 301 will be made corresponding with the depth desired for the tool or drill 29 to enter into the work piece 23, thereby giving uniform depth to each piece that has to be drilled.

It will be noted that there is thus provided an adjustable timing mechanism for advancing and retracting the tool into the work piece. The degree of advancement is dependent upon the flow of the fluid to cylinder 210. The operator, by adjustment of the metering valve 206, can adjustably predetermine the timing of the advance and withdrawal cycles of the tool. Should the tool meet no variation in resistance, the cycles would be uniform but adjustable in timing as determined by the restricted flow of fluid into the cylinder 54. But, frequently, the tool because of variation in heat treating of work pieces, etc., meets a change in resistance which tends to build up a pressure for advancing the piston 52, thereby causing an increase in volume of the fluid flowing into the cylinder 210 and accelerating the advance of the piston 211 to the deceleration of the travel of the piston 52. The faster travelling of the piston 211 will cause a quicker withdrawal of the tool, thus permitting the tool to clear itself of chips and provide for cooling sooner than the setting was made for normal cycling operation, and, therefore, operate in shorter steps the harder the work.

Attention is called to patent to Hirvonen, No. 2,073,518, upon which this invention is based and to which it is an addition. All of the Hirvonen mechanism is incorporated herein although not in all instances described at length. Particular reference is made however to the overload reversal mechanism of the Hirvonen device, which mechanism is made a part of this case because the overload device of Hirvonen is necessary for protection exactly as before, but now combining with the new timing device to create the most efficient and flexible tool of the class described ever presented.

It occasionally happens that a chip lodges under the cutting edge of the drill and rotates therewith and prevents the drill from cutting and thereby advancing. In this event, the back pressure on the piston drops and causes a greater piston-advancing pressure to be built up on the other side of the piston. Hence the pressure on the drill becomes greater and the drill may break. Mechanism is provided to prevent the application of too much pressure on the drill and, when the pressure exceeds a predetermined amount, to retract the drill from the work so as to clear the chip from under the cutting edge of the drill, and then to return the drill into the work. If the drill is unable to cut, due to the continued presence of the chip or for other reasons, the drill is caused to be automatically retracted and advanced until the conditions causing the high pressure on the drill, or other tool, have disappeared, whereupon the normal cycle of operation will be resumed. The arrangement is such that the retracting movement due to the high drill pressure does not advance the cycle of operation, that is, the retraction of the drill does not cause the cam block to be shifted along its slide. The mechanism for effecting the retraction of the tool from the work due to a high pressure on the tool includes a piston valve 284, see Figs. 4 and 10, located in a cylinder 286 of the plate 198 and urged by a spring 288 into a lowermost position where it closes the high pressure port 290 and opens the reversing port 292. The high pressure port is connected by a pipe or duct 296 with the full pressure source. The port 292 is connected by a pipe 298 to admit high pressure behind the reversing piston 186 so as to effect the retraction of the tool. The space under the piston valve 284 is connected by a duct or pipe 400 with the pushing side of the piston 52 and is at all times subjected to the oil pressure on the piston. Under normal working conditions, the spring 288 holds the piston valve 284 in its lowermost position, so that high pressure oil is isolated from the reversing piston 186. When, however, the oil pressure on the pushing side of the piston 52 becomes excessively high, as when a chip becomes lodged under the cutting edge of the drill, or when the drill becomes dull, the pressure through the pipe 400 overcomes the spring pressure and raises the piston valve and thus establishes full oil pressure on the reversing piston 186, which then operates to reverse the valve mechanism of the piston 52 and effect the retraction of the piston at high speed. The piston and tool retract until the tool is clear of the work at which position the latch lever 106 depresses the advancing valve 194 and reverses the position of the aforesaid valve mechanism and hence causes the tool to advance as before, that is, first rapidly down to the original point of engagement of the tool and the work and thence slowly. The tool will automatically retract and advance in the aforesaid manner until the chip has been cleared or until the apparatus is retracted into fully retracted and neutral position by an operative. The automatic reciprocation of the tool under control of the excess pressure valve 284 takes place between the positions of the tool that cause changing of the lengths and rates of the advance and hence does not change the position of the cam block 76 or its slide and so does not modify the usual work cycle. The pressure of the spring 288 on the piston valve 284 and hence the oil pressure at which the valve will be elevated can be varied by screwing a sleeve 402, in which the upper end of the spring 288 is seated, into or out of the plate 108, thus to vary the compression of the spring. Said sleeve can be rotated by a ring 404 which is axially loose thereon but has a spline and slot connection therewith. A lock nut 406 clamps the ring in any adjusted position of the sleeve.

Now it will be clear that the Hirvonen machine drills in steps which will not vary with changes in resistance due to variation in hardness of work, although of course the device takes care of other unexpected changes in working conditions. The present invention, added to the Hirvonen machine, provides for drilling holes in steps that vary in length with change in hardness of work thus prolonging the life of the tool and permitting faster production.

This case is a continuation of Ser. No. 562,212 filed November 6, 1944, now abandoned.

What I claim as new is:

1. A machine of the class described, comprising: a movable tool holder movable toward and away from a work-piece; a cylinder; a piston slidably mounted in said cylinder and connected to said tool holder for, upon delivery of liquid under pressure to either side of said piston, moving said holder toward or away from a work-piece; a valve mechanism controlling delivery of liquid to either side of said piston; a rockable actuating member moving said valve mechanism from one position to another; a slide bar connected to and movable in unison with said piston; cam surfaces carried by said slide bar and cooperating with said actuating member to control the movement of said work tool toward and away from said work-piece and controlling the speed of movement at various positions of movement; a rockable bar connected to said actuating member and, upon rocking in one direction, moving said valve mechanism to position shortening the time for a reverse movement of said piston for moving the tool holder away from the work-piece; a second cylinder; a piston slidably mounted in said second cylinder; a conduit connecting one side of the second-named cylinder to the corresponding side of the first-named cylinder and a second conduit connecting the other sides of the respective cylinders, increased pressure on one side of the first named piston resulting from increased resistance of movement of the tool holder toward the work effecting an increase of fluid volume and hence acceleration of movement of said second-named piston in one direction; and a piston rod connected to said second named piston and extending outwardly from said second named cylinder and engaging said rockable bar and effecting a rocking of the same in said direction upon movement of said second named piston in said direction.

2. A machine of the class described, comprising: a movable tool holder movable toward and away from a work-piece; a cylinder; a piston slidably mounted in said cylinder and connected to said tool holder for, upon delivery of liquid under pressure to either side of said piston, moving said holder toward or away from a work-piece; a cylinder; a piston slidably mounted in said cylinder and connected to said tool holder for, upon delivery of liquid under pressure to either side of said piston, moving said holder toward or away from a work-piece; a valve mechanism controlling delivery of liquid to either side of said piston, a rockable actuating member moving said valve mechanism from one position to another; a slide bar connected to and movable in unison with said piston; cam surfaces carried by said slide bar and cooperating with said actuating member to control the movement of said work tool toward and away from said work-piece and controlling the speed of movement at various positions of movement; a rockable bar connected to said actuating member and, upon rocking in one direction, moving said valve mechanism to position shortening the time for a reverse movement of said piston for moving the tool holder away from the work-piece; a second cylinder; a piston slidably mounted in said second cylinder; a conduit connecting one side of the second-named cylinder to the corresponding side of the first-named cylinder and a second conduit connecting the other sides of the respective cylinders, increased pressure on one side of the first named piston resulting from increased resistance of movement of the tool holder toward the work effecting an increased movement of said second named piston in one direction; and a piston rod connected to said second named piston and extending outwardly from said second named cylinder and engaging said rockable bar and effecting a rocking of the same in said direction upon movement of said second named piston in said direction; and a manually operable means controlling the flow of liquid from one side of said first named cylinder to one side of said second named cylinder.

3. A machine of the class described, comprising: a movable tool holder movable toward and away from a work-piece; a cylinder; a piston slidably mounted in said cylinder and connected to said tool holder for, upon delivery of liquid under pressure to either side of said piston, moving said holder toward or away from a work-piece; a valve mechanism controlling delivery of liquid to either side of said piston; a rockable actuating member moving said valve mechanism from one position to another; a slide bar connected to and movable in unison with said piston; cam surfaces carried by said slide bar and cooperating with said actuating member to control the movement of said work tool toward and away from said work-piece and controlling the speed of movement at various positions of movement; a rockable bar connected to said actuating member and, upon rocking in one direction, moving said valve mechanism to position shortening the time for a reverse movement of said piston for moving the tool holder away from the work-piece; a second cylinder; a piston slidably mounted in said second cylinder; a conduit connecting one side of the second-named cylinder to the corresponding side of the first-named cylinder and a second conduit connecting the other sides of the respective cylinders, increased pressure on one side of the first named piston resulting from increased resistance of movement of the tool holder toward the work effecting an increased movement of said second named piston in one direction; and a piston rod connected to said second named piston and extending outwardly from said second named cylinder for engaging said rockable bar and effecting a rocking of the same in said direction upon movement of said second named piston in said direction; and a manually operable means controlling the flow of liquid from one side of said first named cylinder to one side of said second named cylinder, said cam surfaces being movable into and out of engagement with said actuating member; and means reversing the direction of travel of the piston in said first-named cylinder for effecting a movement of the tool holder toward the work-piece, upon disengagement of said cam surfaces with said actuating member upon withdrawal of said tool holder a predetermined distance.

4. A machine of the class described, comprising: a movable tool holder movable toward and away from a work-piece; a cylinder; a piston slidably mounted in said cylinder and connected to said tool holder for, upon delivery of liquid under pressure to either side of said piston, moving said holder toward or away from a work-piece; a valve mechanism controlling delivery of liquid to either side of said piston, an actuating member moving said valve mechanism from one position to another; a slide bar connected to and movable in unison with said piston; cam surfaces carried by said slide bar and cooperating with said actuating member to control the movement of said work tool toward and away from said work-piece and controlling the speed of movement at various positions of movement; a movable bar connected to said actuating member and, upon moving in one direction, moving said valve mechanism to position shortening the time for a reverse movement of said piston moving the tool holder away from the work-piece; a second cylinder; a piston slidably mounted in said second cylinder; a conduit connecting one side of the second-named cylinder to the corresponding side of the first-named cylinder and a second conduit connecting the other sides of the respective cylinders, increased pressure on one side of the first named piston resulting from increased resistance of movement of the tool holder toward the work effecting an increased movement of said second named piston in one direction; and a piston rod connected to said second named piston and extending outwardly from said second named cylinder and engaging said movable bar and effecting a movement of the same in said direction upon movement of said second named piston in said direction.

5. A machine of the class described, comprising: a movable tool holder movable toward and away from a work-piece; a cylinder; a piston slidably mounted in said cylinder and connected to said tool holder for, upon delivery of liquid under pressure to either side of said piston, moving said holder toward or away from a work-piece; a cylinder; a piston slidably mounted in said cylinder and connected to said tool holder for, upon delivery of liquid under pressure to either side of said piston, moving said holder toward or away from a work-piece; a valve mechanism for controlling delivery of liquid to either side of said piston; an actuating member moving said valve mechanism from one position to another; a slide bar connected to and movable in unison with said piston; cam surfaces carried by said slide bar and cooperating with said actuating member to control the movement of said work tool toward and away from said work-piece and controlling the speed of movement at various positions of movement; a movable bar connected to said actuating member and, upon moving in one direction, for moving said valve mechanism to position shortening the time for a reverse movement of said piston for moving the tool holder away from the work-piece; a second cylinder; a piston slidably mounted in said second cylinder; a conduit connecting one side of the second-named cylinder to the corresponding side of the first-named cylinder and a second conduit connecting the other sides of the respective cylinders, increased pressure on one side of the first named piston resulting from increased resistance of movement of the tool holder toward the work effecting a movement of said second named piston in one direction; and a piston rod connected to said second named piston and extending outwardly from said second named cylinder and engaging said movable bar and effecting a motion of the same in said direction upon movement of said second named piston in said direction; and a manually operable means for controlling the flow of liquid from one side of said first named cylinder to one side of said second named cylinder.

6. A machine of the class described, comprising: a movable tool holder movable toward and away from a work-piece; a cylinder; a piston slidably mounted in said cylinder and connected to said tool holder for, upon delivery of liquid under pressure to either side of said piston, moving said holder toward or away from a work-piece; a valve mechanism controlling delivery of liquid to either side of said piston; an actuating member moving said valve mechanism from one position to another; a slide bar connected to and movable in unison with said piston; cam surfaces carried by said slide bar and cooperating with said actuating member to control the movement of said work tool toward and away from said work-piece and controlling the speed of movement at various positions of movement; a movable bar connected to said actuating member and, upon moving in one direction, moving said valve mechanism to position shortening the time for a reverse movement of said piston for moving the tool holder away from the work-piece; a second cylinder; a piston slidably mounted in said second cylinder; a conduit connecting one side of the second-named cylinder to the corresponding side of the first-named cylinder and a second conduit connecting the other sides of the respective cylinders, increased pressure on one side of the first named piston resulting from increased resistance of movement of the tool holder toward the work effecting a movement of said second named piston in one direction; and a piston rod connected to said second named piston and extending outwardly from said second named cylinder engaging said movable bar and effecting a motion of the same in said direction upon movement of said second named piston in said direction; and a manually operable means reversing the direction of travel of the piston in said first named cylinder for effecting a movement of the tool holder toward the work-piece controlling the flow of liquid from one side of said first named cylinder to one side of said second named cylinder, said cam surfaces being movable into and out of engagement with said actuating member; and means for reversing upon disengagement of said cam surfaces with said actuating member upon withdrawal of said tool holder a predetermined distance.

7. Timing mechanism for a machine tool comprising a tool holder movable to and from a work piece, a main cylinder and piston therefor, a source of fluid pressure, a valve for controlling delivery of fluid to either end of the cylinder, a valve actuating member to effect reversal of the piston travel, and a fluid operated device to operate the valve actuating member, said device comprising a second cylinder, a piston and piston rod therefor, and means moved by the piston rod and connected to the valve actuating member, said second cylinder being directly connected at its ends to corresponding ends of the main cylinder, said second piston being moved in the second cylinder in a direction to cause operation of the valve actuating member by reason of the flow of fluid received from the side of the main piston occasioning the working stroke of the tool holder, said flow being dependent upon pressure in the cylinder and increasing at higher pressures and decreasing at lower pressures to automatically vary the timing of the tool stroke.

8. Tool stroke timing mechanism for a machine tool comprising a tool holder movable to and from a work piece, a main cylinder and piston therefor, a source of fluid pressure, a valve for controlling delivery of fluid to either end of the cylinder, a valve actuating member to effect reversal of the piston travel, and a fluid operated device to operate the valve actuating member, said device comprising a second cylinder, a piston and piston rod therefor, and means moved by the piston rod and connected to the valve actuating member, said second cylinder being directly connected at its ends to corresponding ends of the main cylinder, said second piston being moved in the second cylinder in a direction to cause operation of the valve actuating member by reason of the volume of fluid received from the side of the main piston occasioning the working stroke of the tool holder, means to adjust the flow of fluid from the working side of the main cylinder to the working side of the second cylinder.

FRED W. KRIEWALL.

REFERENCES CITED

The following references are of record in the file of this patent:

UNITED STATES PATENTS

| Number | Name | Date |
| --- | --- | --- |
| 2,073,518 | Hirvonen | Mar. 9, 1937 |
| 2,079,640 | Vickers et al. | May 11, 1937 |
| 2,178,915 | McKee et al. | Nov. 7, 1939 |